United States Patent
Altunbasak et al.

(12) 
(10) Patent No.: US 6,597,816 B1
(45) Date of Patent: Jul. 22, 2003

(54) CORRECTING DISTORTION IN AN IMAGING SYSTEM USING PARAMETRIC MOTION ESTIMATION

(75) Inventors: Yucel Altunbasak, Mountain View, CA (US); Andrew Patti, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/183,820

(22) Filed: Oct. 30, 1998

(51) Int. Cl.[7] .............................. G06T 5/00; H04N 5/21; H04N 5/225
(52) U.S. Cl. ........................ 382/275; 382/107; 348/241
(58) Field of Search ................................. 382/275, 107, 382/254, 274, 291, 286; 348/208.1, 241, 352, 607, 620, 335

(56) References Cited

U.S. PATENT DOCUMENTS

| | | | | |
|---|---|---|---|---|
| 5,400,083 A | * | 3/1995 | Mizusawa | 348/607 |
| 5,867,228 A | * | 2/1999 | Miki et al. | 348/607 |
| 6,173,087 B1 | * | 1/2001 | Kumar et al. | 382/284 |

OTHER PUBLICATIONS

G. P. Stein; "Accurate Internal Camera Calibration using Rotation, with Analysis of Sources of Error"; Jun. 20, 1995; Proceedings of the International Conference on Computer Vision, US, Los Alamitos, IEEE Comp. Soc. Press, vol. Conf. 5; pp. 230–236.

European Search Report, Application No.: EP 99 30 8405, dated May 23, 2001.

Guo–Qing Wei, et al.; "Active self–Calibration of Hand Cameras and Hand–eye Relations with Motion Planning"; Apr. 20, 1997; Proceedings of the IEEE International Conference on Robotics and Automation, US, New York; pp. 1359–1364.

G. P. Stein; "Lens Distortion Calibration Using Point Correspondences"; Jun., 1997; IEEE Computer Society Conference on Computer Vision and Pattern Recognition, San Juan, Puerto Rico; pp. 602–608.

* cited by examiner

*Primary Examiner*—Scott Rogers

(57) ABSTRACT

Distortion correction in an imaging system using parametric motion estimation. Parametric motion estimation is used to correct for geometric lens distortion and illumination changes. Models for geometric lens distortion and different illumination models are presented, as is a method for an iterative linearising method of solving the resulting sets of nonlinear equations.

16 Claims, 3 Drawing Sheets

CORRECTING DISTORTION IN AN IMAGING SYSTEM USING PARAMETRIC MOTION ESTIMATION

BACKGROUND OF THE INVENTION

1. Field of the Invention

The present invention deals with the correction of distortion in imaging systems, more particularly to systems such as scanners and in cameras used in applications such as image capture and video conferencing.

2. Art Background

With the advent of inexpensive imaging sensors, applications such as video conferencing and remote image capture are becoming more prevalent. As manufacturers provide imaging systems at lower and lower price points, compromises are made especially in the optics provided, leading to systems having geometric lens distortion. As these systems are placed in more locations, problems with illumination arise, both as a result of variations in lighting conditions, as well as the effect of automatic brightness controls in the imaging systems themselves.

The field of motion estimation deals with processing images for example to stitch together successive overlapping images to form a unified mosaic. These motion estimation techniques deal with arrays of pixels, and operate by deriving the motion between a group of pixels in one frame and the same pixels in a new position in a second frame. For motion estimation to succeed, the illumination levels and therefore pixel intensity between the two frames must be the same, and the frames must be relatively free of geometric distortion. What is needed is a way to correct for the effects of geometric lens distortion in motion estimation, and to correct for changes in illumination that effect pixel density.

SUMMARY OF THE INVENTION

Motion estimation techniques and the Optical Flow Equation (OFE) are applied to correct for distortion in an imaging system. Geometric lens distortion is corrected using a novel optical correction model. Illumination changes are corrected using both simple and Vignetting models. The solutions involve solving of a set of nonlinear equations. Typical solutions to these equations are computationally expensive. An iterative linearising solution is presented.

BRIEF DESCRIPTION OF THE DRAWINGS

The present invention is described with respect to particular exemplary embodiments thereof and reference is made to the drawings in which.

DETAILED DESCRIPTION

Inexpensive imaging sensors are enabling more applications of imaging technologies, such as video conferencing and image scanning. Compromises in sensor design, and in sensor placement lead to distortions in the resulting images.

Motion estimation techniques deal with processing images for example to stitch together successive overlapping images to form a unified mosaic; this technique us used for example in assembling scanned images of a large area using multiple passes of an imaging sensor. Motion estimation allows the overlaps to be recognized and the smaller images from each pass stitched together to form the larger unified mosaic. Similar techniques also arise in videoconferencing when the videoconferencing camera is moved, or a videoconferencing camera is used to scan a document.

To succeed, motion estimation presupposes the illumination and therefore pixel densities of overlapping image portions to be the same, and that the images are free from geometric distortion. Inexpensive optics introduce geometric distortion, and may also introduce illumination differences such as vignetting, the gradual fall off of illumination or image density away from the central axis of the image sensor. Additional illumination distortions are introduced by automatic brightness controls in image sensors, and by poor or uneven illumination in the environment.

Two dimensional motion estimation refers to determining the displacements or velocities of pixels from one frame to another. The motion is induced as the same physical point on the surface of an object in 3-D space is mapped to different locations within the imaging plane at different time. In the sampled image domain this results in different pixel indices. This difference in pixel indices taken relative to one of the frames is called the "motion vector" at that pixel between those two frames. Each pixel in the image has a motion vector of dimension two representing horizontal and vertical displacements. The collection of all motion vectors is sometimes called the "motion vector field", or simply "motion field". The term "field" should be understood in a broader sense, not in strict mathematical definition of "vector field". Motion estimation from sequences of images is discussed for example in A. M. Tekalp, *Digital Video Processing*, Prentice Hall Signal Processing Series; M. I. Sezan and R. L. Lagendijk, *Motion Analysis and Image Sequence Processing*, Norwell, Mass.: Kluwer, 1993; and J. K. Aggarwal and N. Nandhakumar, "On the computation of motion from sequences of images- A review," *Proc. IEEE*, vol. 76, pp. 917–935, August 1988.

Figure 1:
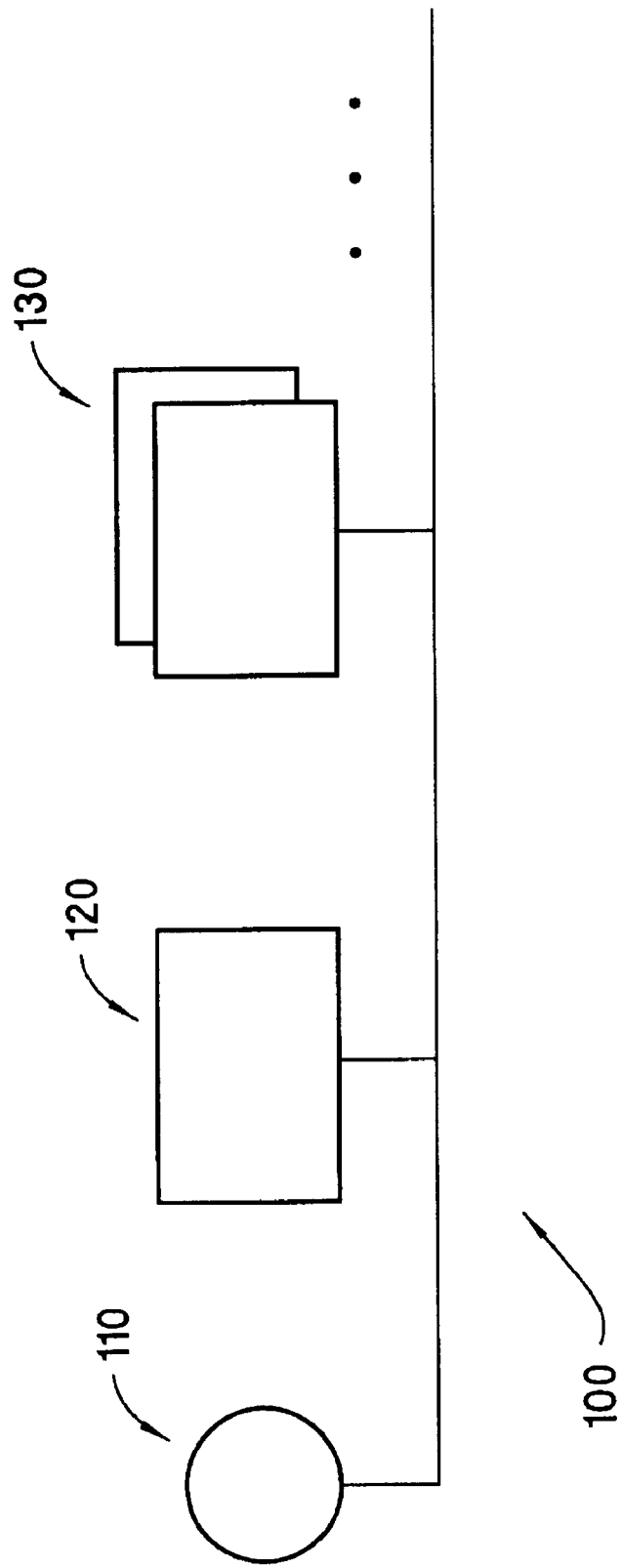
FIG. 1 is a block diagram of an imaging system.

FIG. 1 shows a system for performing motion estimation. Bus 100 interconnects image capture device 110 with central processing unit (CPU) 120. Memory hierarchy 130 provides storage for instructions and data, including storage of frames if data from information capture device 110, typically containing a mixture of RAM, ROM, and permanent disc storage. Not shown are other typical items such as displays and network connections. Image capture device 110 may be a device such as a television camera with appropriate frame capture hardware, or other imaging device such as a teleconferencing camera, CCD image sensor, scanner, or the like.

Optical Flow

In principle, all pixels within an image can be thought to follow a given trajectory through time. The trajectory of a given pixel can be parameterized via time, given an initial position at some reference time. If we take the reference time as $t=t_1$, then $$c(t;x,y,t_1)=(x(t;x,y,t_1),y(t;x,y,t_1),t),$$

where c denotes the trajectory followed by a pixel originating at $(x,y,t_1)$. For the development that follows, we abbreviate $x(t;x,y,t_1)$ as $x(t)$, and apply similar abbreviations for $y(t)$ and $c(t)$. Even though physical conditions generally limit the variation between trajectories of neighboring pixels, conditions such as occlusion and uncovered background can lead to arbitrary (independent) trajectories amongst neighboring pixels. In this treatment we neglect occlusion and uncovered background.

Assuming further the intensity/color value of a pixel does not change with time along the motion trajectory, then, with I(x,y,t) denoting the intensity function, $$\frac{dI(c(t))}{dt} = 0. \tag{1}$$

Using the chain rule of vector calculus, Equation (1) can be written as $$\frac{dI(c(t))}{dt} = \frac{\partial I(x, y, t)}{\partial x}\frac{dx(t)}{dt} + \frac{\partial I(x, y, t)}{\partial y}\frac{dy(t)}{dt} + \frac{\partial I(x, y, t)}{\partial t}\frac{dt}{dt} = 0. \tag{2}$$

Letting $$I_x(x, y, t) = \frac{\partial I(x, y, t)}{\partial x} \tag{3}$$

$$I_y(x, y, t) = \frac{\partial I(x, y, t)}{\partial y}$$

$$I_t(x, y, t) = \frac{\partial I(x, y, t)}{\partial t}$$

results in $$I_x(x,y,t)x'(t)+I_y(x,y,t)y'(t)+I_t(x,y,t)=0, \tag{4}$$

where $I_x$ and $I_y$ are the spatial image gradients, $I_t$ is the temporal image gradient, and where x' and y' are the horizontal and vertical velocity components respectively. Equation (4) is called the optic-flow-equation (OFE), sometimes abbreviated as:

$$I_x x' + I_y y' + I_t = 0. \tag{5}$$

We can proceed using (4) in two equivalent ways. In the first approach integrate both sides of (4) from $t_1$ to $t_2$ with respect to t, and assume both $I_x(x,y,t)$ and $I_y(x,y,t)$ are constant with respect to time to obtain:

$$I_x(x,y,t)(x(t_2)-x(t_1))+I_y(x,y,t)(y(t_2)-y(t_1))+(I(x,y,t_2)-I(x,y,t_1))=0. \tag{6}$$

For convenience, define:

$$I_2(x,y)=I(x,y,t_2),\ I_1(x,y)=I(x,y,t_1),\ I_{21}(x,y)=I_2(x,y)-I_1(x,y) \tag{7}$$

and $$u(x,y)=x(t_2)-x(t_1),\ v(x,y)=y(t_2)-y(t_1), \tag{8}$$

to obtain $$I_x(x,y)u(x,y)+I_y(x,y)v(x,y)+I_{21}(x,y)=0. \tag{9}$$

As a result of assuming $I_x$ and $I_y$ are constant with respect to time between $t_1$ and $t_2$, we drop time dependence from the notation. Second, this assumption taken together with the continuity of intensity assumption and (1) implies that $I_t(x,y,t)$ is constant between $t_1$ and $t_2$. This allows for trivial integration of $I_t(x,y,t)$ on this interval. Lastly, estimates of $I_x$ and $I_y$ can be obtained anywhere on $[t_1,t_2]$. This is important to note because if we begin with just two frames at $t_1$ and $t_2$, we can discretely estimate $I_x$ and $I_y$ using either frame.

The second method of proceeding from (5) is to approximate the derivatives involved by first order differences and then multiply through by $(t_2-t_1)$. Then, once again, if we have just two frames at $t_1$ and $t_2$, we can discretely estimate $I_x$ and $I_y$ using either frame, and the interpretation of this amounts to whether we employ a forward or backward approximation to estimate the derivatives.

In the development to this point it has been assumed that there is an explicit temporal evolution of the image intensity distribution. To enforce this assumption the chain rule has been applied to the intensity distribution temporal derivative. We can equivalently, however, begin from a completely discrete perspective and proceed instead by applying a 2-D spatial Taylor series approximation. To that end, assume from the onset that we have two captured frames at times $t_1$ and $t_2$. Now, the notion of intensity invariance is expressed as (ignoring illumination change effects):

$$I_1(x_1,y_2)=I_2(x_2,I_{y2}), \tag{10}$$

where $I_1(x_1,y_1)$ refers to the image intensity at the pixel $(x_1,y_1)$ in the first frame captured at time $t_1$, and $I_2(x_2,y_2)$ refers to the intensity at the point $(x_2,y_2)$ in the second frame captured at time $t_2$. Note that $(x_1,y_1)$ are integer valued, but $(x_2,y_2)$ are real-valued. Both $I_1$ and $I_2$ are assumed to be continuous and differentiable functions with respect to x and y. Using the definition of motion vectors, one can write $$x_2=x_1+u(x_1,y_1)$$

$$y_2=y_1+v(x_1,y_1) \tag{11}$$

where u(.,.) and v(.,.) are the horizontal and vertical motion vectors, respectively. Combining Equations (10) and (11), and using a Taylor Series Expansion of differentiable functions, $$I_1(x_1, y_1)=I_2(x_1+u(x_1, y_1), y_{1+v}(x_1, y_1))$$

$$I_1(x_1, y_1) = I_2(x_1 + u(x_1, y_1), y_1 + v(x_1, y_1)) \tag{12}$$

$$= I_2(x_1, y_1) + \frac{\partial I_2(x, y)}{\partial x}\bigg|_{x_1,y_1} u(x_1, y_1) + \frac{\partial I_2(x, y)}{\partial y}\bigg|_{x_1,y_1} v(x_1, y_1) + h.o.t$$

The Taylor series is expanded around the pixel $(x_1,y_1)$. Assuming either that $u(x_1,y_1)$ and $v(x_1,y_1)$ are small quantities or that the higher order terms are all zero, we can disregard the higher order terms in Equation (12), and arrive at $$\frac{\partial I_2(x, y)}{\partial x}\bigg|_{x_1,y_1} u(x_1, y_1) + \frac{\partial I_2(x, y)}{\partial y}\bigg|_{x_1,y_1} v(x_1, y_1) + \tag{13}$$

$$(I_2(x_1, y_1) - I_1(x_1, y_1)) \cong 0.$$

Note that by employing the same notation as in the previous development we write $$I_x(x,y)u(x,y)+I_y(x,y)v(x,y)+I_{21}(x,y)=0, \tag{14}$$

which is the same result (9) previously arrived at.

Parametric Motion Models

In many realistic imaging scenarios a 2-D motion field is induced by either camera motion or objects in the 3-D world undergoing a rigid motion. Each of these effects produces a smoothly varying 2-D motion field (provided that the depth of the objects does not change swiftly in proportion to its distance to imaging device). Noting the fact that the motion field is smoothly varying, there have been attempts to describe it using a parametric model. Namely, the motion vector at any pixel needs to obey a model characterized by a few parameters. Therefore, the motion vector of a pixel is completely represented by the model parameters and its location.

Given a vector of model parameters a the motion is expressed as $u(x,y)=f(x,y;a)$ and $v(x,y)=g(x,y;a)$. In order to estimate the model parameters we define the following cost function, $$\Psi = \sum_{x,y \in I} \{(I_x u + I_y v + I_{21})^2\}. \quad (15)$$

The parameter estimation procedure is to take derivatives of $\psi$ with respect to each element of a, set those derivatives to zero, then solve the resulting set of equations. For non-linear models f and g a linearization step is typically employed.

In the following, we will examine the parametric motion models: 1) translational motion, 2) affine motion, 3) bilinear motion, and 4) perspective motion. These parametric motion models can be shown to be the projection of the motion of simple 3-D objects, such as a plane, under different projection models onto the 2-D imaging plane. Lastly, (15) is extended to include a-priori information and apply the result to estimate constrained global translational motion.

Translational Motion Estimation

One of the simplest models that can be imposed on the motion vector field is that all the motion vectors be the same, i.e. every pixel in the image is moving in the same direction by the same amount. This motion model is usually called "global translational motion". However, it should be noted that translational motion does not necessarily mean that objects in the 3-D (real) world translate. 3-D translational motion could only be reduced to a 2-D translational model under the assumption that the 3-D object is a planar object, and an orthographic camera model is utilized. Additionally, global translational motion can be induced by a camera translation while a "distant" scene is being imaged. It may sound a very restrictive motion model, however there are applications to which this model perfectly fits. An example is multi-frame resolution enhancement technologies for scanner applications, where multiple scans of a flat page are taken such that a translational shift occurs between each scan.

The motion model constraints for this case are $$u(x,y)=u_g v(x,y)=v_g \quad (16)$$

where $u_g$ and $v_g$ refer to global horizontal and vertical displacements. Then, taking the derivatives of (15) with respect to u and v, and setting them equal to zero yields $$\frac{\partial \Psi}{\partial u} = \sum_{x,y \in I} 2(I_x u_g + I_y v_g + I_{21})I_x = 0 \quad (17)$$

$$\frac{\partial \Psi}{\partial v} = \sum_{x,y \in I} 2(I_x u_g + I_y v_g + I_{21})I_y = 0$$

Equation (17) can be re-written in the matrix form as follows:

$$\begin{bmatrix} \sum_{x,y \in I} I_x^2 & \sum_{x,y \in I} I_x I_y \\ \sum_{x,y \in I} I_x I_y & \sum_{x,y \in I} I_y^2 \end{bmatrix} \begin{bmatrix} u_g \\ v_g \end{bmatrix} = \begin{bmatrix} -\sum_{x,y \in I} I_x I_{21} \\ -\sum_{x,y \in I} I_y I_{21} \end{bmatrix} \quad (18)$$

Equation (18) can be solved to estimate global displacement parameters.

Affine Motion

Affine motion is another commonly employed motion model. It can account for 2-D transformations such as global rotation, translation, zoom and skew. Physically, affine motion is generated between two images when the 3-D scene is planar and two images are acquired using different imaging plane positions under the orthogonal projection. The affine motion model is described by $$u(x,y)=a_1 x+a_2 y+a_3$$

$$i\ v(x,y)=a_4 x+a_5 y+a_6 \quad (19)$$

where $a_1,a_2,a_3,a_4,a_5,a_6$ are model parameters (sometimes called "Affine Parameters") and (x,y) is the pixel location. Note that global translational motion results when $a_1$, $a_2$, $a_4$ and $a_5$ are all zero.

To solve for optimal affine parameters in the Least Square sense, we expand (15) as $$\Psi = \sum_{x,y \in I} \{I_x(x,y)(xa_1 + ya_2 + a_3) + I_y(x,y)(xa_4 + ya_5 + a_6) + I_{21}(x,y)\}^2$$

As previously mentioned, $\psi$ is minimized by taking the derivatives with respect to the affine parameters $a_1,a_2,a_3,a_4,a_5,a_6$, and setting each derivative equal to zero. After carrying out the algebra, one can arrive at the following linear matrix equation.

$$\begin{bmatrix} \sum_{x,y \in I} xI_x xI_x & \sum_{x,y \in I} xI_x yI_x & \sum_{x,y \in I} xI_x I_x & \sum_{x,y \in I} xI_x xI_y & \sum_{x,y \in I} xI_x yI_y & \sum_{x,y \in I} xI_x I_y \\ \sum_{x,y \in I} yI_x xI_x & \sum_{x,y \in I} yI_x yI_x & \sum_{x,y \in I} yI_x I_x & \sum_{x,y \in I} yI_x xI_y & \sum_{x,y \in I} yI_x yI_y & \sum_{x,y \in I} yI_x I_y \\ \sum_{x,y \in I} I_x xI_x & \sum_{x,y \in I} I_x yI_x & \sum_{x,y \in I} I_x I_x & \sum_{x,y \in I} I_x xI_y & \sum_{x,y \in I} I_x yI_y & \sum_{x,y \in I} I_x I_y \\ \sum_{x,y \in I} xI_y xI_x & \sum_{x,y \in I} xI_y yI_x & \sum_{x,y \in I} xI_y I_x & \sum_{x,y \in I} xI_y xI_y & \sum_{x,y \in I} xI_y yI_y & \sum_{x,y \in I} xI_y I_y \\ \sum_{x,y \in I} yI_y xI_x & \sum_{x,y \in I} yI_y yI_x & \sum_{x,y \in I} yI_y I_x & \sum_{x,y \in I} yI_y xI_y & \sum_{x,y \in I} yI_y yI_y & \sum_{x,y \in I} yI_y I_y \\ \sum_{x,y \in I} I_y xI_x & \sum_{x,y \in I} I_y yI_x & \sum_{x,y \in I} I_y I_x & \sum_{x,y \in I} I_y xI_y & \sum_{x,y \in I} I_y yI_y & \sum_{x,y \in I} I_y I_y \end{bmatrix} \begin{bmatrix} a_1 \\ a_2 \\ a_3 \\ a_4 \\ a_5 \\ a_6 \end{bmatrix} = \begin{bmatrix} -\sum_{x,y \in I} xI_x I_{21} \\ -\sum_{x,y \in I} yI_x I_{21} \\ -\sum_{x,y \in I} I_x I_{21} \\ -\sum_{x,y \in I} xI_y I_{21} \\ -\sum_{x,y \in I} xI_y I_{21} \\ -\sum_{x,y \in I} I_y I_{21} \end{bmatrix}$$

Bilinear Motion

The global bilinear transform is used to improve on the capabilities of the affine transform, yet still yield a linear estimation problem. In the case of an affine transformation parallel lines always remain parallel. This is not the case for motion induced by a perspective-projection imaging model. The perspective model, however, which will be treated next, yields a non-linear problem. The bilinear transform can be a good compromise in that it transforms horizontal and vertical straight lines into straight lines, but does not produce parallel lines for any given parallel pair lines. The potential problem in using a bilinear transform is that lines that are not horizontal or vertical will be transformed to have some degree of curvature. If the curvature becomes severe the transform may not be representative of the actual motion and imaging system.

The derivation of global bilinear motion model estimation is quite similar to affine motion model estimation. In particular, the motion field is governed by:

$$u(x,y) = a_1 + a_2 x + a_3 y + a_4 xy$$
$$v(x,y) = a_5 + a_6 x + a_7 y + a_8 xy \quad (20)$$

By substituting (20) into (15) and setting the derivatives with respect to model parameters equal to zero, we obtain,

Perspective Motion

The perspective motion model is the most versatile of the motion models used thus far. Physically, the perspective model takes into account the 2-D mapping induced among perspective projected images of a plane in 3-D under different focal plane positions. A complication is that the perspective model is nonlinear in its model parameters.

The motion field in global perspective model is governed by the following equations.

$$u(x, y) = \frac{a_1 x + a_2 y + a_3}{a_7 x + a_8 y + 1} - x \quad (21)$$

$$v(x, y) = \frac{a_4 x + a_5 y + a_6}{a_7 x + a_8 y + 1} - y$$

Before using these model parameters in (15) they are first linearized around the default perspective parameter a=(1,0,0,0,1,0,0,0) to yield $$u(x,y) \cong (a_1 - 1)x + a_2 y + a_3 - a_7 x^2 - a_8 xy$$
$$v(x,y) \cong a_4 x + (a_5 - 1)y + a_6 - a_7 xy - a_8 y^2 \quad (22)$$

To solve for optimal perspective motion model parameters in the Least Square sense, we apply (22) to (15) and obtain $$\begin{bmatrix} \sum I_x I_x & \sum xI_x I_x & \sum yI_x I_x & \sum xyI_x I_x & \sum I_y I_x & \sum xI_y I_x & \sum yI_y I_x & \sum xyI_y I_x \\ \sum I_x xI_x & \sum xI_x xI_x & \sum yI_x xI_x & \sum xyI_x xI_x & \sum I_y xI_x & \sum xI_y xI_x & \sum yI_y xI_x & \sum xyI_y xI_x \\ \sum I_x yI_x & \sum xI_x yI_x & \sum yI_x yI_x & \sum xyI_x yI_x & \sum I_y yI_x & \sum xI_y yI_x & \sum yI_y yI_x & \sum xyI_y yI_x \\ \sum I_x xyI_x & \sum xI_x xyI_x & \sum yI_x xyI_x & \sum xyI_x xyI_x & \sum I_y xyI_x & \sum xI_y xyI_x & \sum yI_y xyI_x & \sum xyI_y xyI_x \\ \sum I_x I_y & \sum xI_x I_y & \sum yI_x I_y & \sum xyI_x I_y & \sum I_y I_y & \sum xI_y I_y & \sum yI_y I_y & \sum xyI_y I_y \\ \sum I_x xI_y & \sum xI_x xI_y & \sum yI_x xI_y & \sum xyI_x xI_y & \sum I_y xI_y & \sum xI_y xI_y & \sum yI_y xI_y & \sum xyI_y xI_y \\ \sum I_x yI_y & \sum xI_x yI_y & \sum yI_x yI_y & \sum xyI_x yI_y & \sum I_y yI_y & \sum xI_y yI_y & \sum yI_y yI_y & \sum xyI_y yI_y \\ \sum I_x xyI_y & \sum xI_x & \sum yI_x & \sum xyI_x & \sum I_y & \sum xI_y & \sum yI_y & \sum xyI_y \end{bmatrix} \begin{bmatrix} a_1 \\ a_2 \\ a_3 \\ a_4 \\ a_5 \\ a_6 \\ a_7 \\ a_8 \end{bmatrix} = \begin{bmatrix} \sum I_x \\ \sum \\ \sum yI_x \\ \sum xyI_x \\ \sum \\ \sum \\ \sum yI_y \\ \sum \end{bmatrix}$$

$$\Psi = \sum_{x,y \in I} \left\{ \begin{array}{l} I_x(x,y)((a_1-1)x + a_2 y + a_3 - a_7 x^2 - a_8 xy) + \\ I_y(x,y)(a_4 x + (a_5-1)y + a_6 - a_7 xy - a_8 y^2) + I_{21}(x,y) \end{array} \right\}^2$$

To minimize $\Psi$, we take the derivatives of $\Psi$ with respect to perspective parameters $a_1$, $a_2$, $a_3$, $a_4$, $a_5$, $a_6$, $a_7$, and $a_8$ and set them equal to zero. After carrying out the algebra, one can arrive at the following linear matrix equation.

$$\begin{bmatrix} \sum xI_x I_x & \sum yI_x I_x & \sum I_x I_x & \sum xI_y I_x & \sum yI_y I_x & \sum I_y I_x & \sum \eta I_x & \sum \mu I_x \\ \sum xI_x I_y & \sum yI_x I_y & \sum I_x I_y & \sum xI_y I_y & \sum yI_y I_y & \sum I_y I_y & \sum \eta I_y & \sum \mu I_y \\ \sum xI_x I_x & \sum yI_x I_x & \sum I_x I_x & \sum xI_y I_x & \sum yI_y I_x & \sum I_y I_x & \sum \eta I_x & \sum \mu I_x \\ \sum xI_x I_y & \sum yI_x I_y & \sum I_x I_y & \sum xI_y I_y & \sum yI_y I_y & \sum I_y I_y & \sum \eta I_y & \sum \mu I_y \\ \sum xI_x I_y & \sum yI_x I_y & \sum I_x I_y & \sum xI_y I_y & \sum yI_y I_y & \sum I_y I_y & \sum \eta I_y & \sum \mu I_y \\ \sum xI_x I_y & \sum yI_x I_y & \sum I_x I_y & \sum xI_y I_y & \sum yI_y I_y & \sum I_y I_y & \sum \eta I_y & \sum \mu I_y \\ \sum xI_x \eta & \sum yI_x \eta & \sum I_x \eta & \sum xI_y \eta & \sum yI_y \eta & \sum I_y \eta & \sum \eta\eta & \sum \mu\eta \\ \sum xI_x \mu & \sum yI_x \mu & \sum I_x \mu & \sum xI_y \mu & \sum yI_y \mu & \sum I_y \mu & \sum \eta\mu & \sum \mu\mu \end{bmatrix} \begin{bmatrix} a_1-1 \\ a_2 \\ a_3 \\ a_4 \\ a_5-1 \\ a_6 \\ a_7 \\ a_8 \end{bmatrix} = \begin{bmatrix} -\sum xI_x I_t \\ -\sum yI_x I_{21} \\ -\sum I_x I_{21} \\ -\sum xI_y I_{21} \\ -\sum yI_y I_{21} \\ -\sum I_y I_{21} \\ -\sum \eta I_{21} \\ -\sum \mu I_{21} \end{bmatrix} \quad (23)$$

where $$\eta = x^2 I_x + xy I_y$$

$$\mu = xy I_x + y^2 I_y$$

Note that we have utilized the Taylor Series Approximation twice, in contrast to all previous derivations. Until this point, only linearization of the intensity function has been required. However, we had to additionally linearize the motion model to derive the Linear Matrix Equation form of Equation (23). Due to this added linearization step, perspective parameter estimation can be less accurate and stable.

In some applications, one may have a-priori information relating to the motion model parameters. Such information, for instance, could be a probability distribution of the model parameters. We take this additional information into account by modifying the cost function (15) such that $$\Psi = \sum_{x,y \in I} \{(I_x u + I_y v + I_t)^2 + \varphi(u,v)\} \quad (24)$$

Where the a-priori information is embodied using $\varphi(u,v)$.

We will only derive the equations to estimate the global translational motion model parameters under such constraints. In this case we proceed as before and obtain $$\frac{\partial \Psi}{\partial u} = \sum_{x,y \in I} \left\{ 2(I_x u_g + I_y v_g + I_{21}) I_x + \frac{\partial \varphi}{\partial u} \right\} = 0 \quad (25)$$

$$\frac{\partial \Psi}{\partial v} = \sum_{x,y \in I} \left\{ 2(I_x u_g + I_y v_g + I_{21}) I_y + \frac{\partial \varphi}{\partial v} \right\} = 0$$

At this point, assume that the constraint cost function is a quadratic function in u and v. This assumption is made to arrive at a linear matrix equation for optimal motion parameter estimation. Although any differentiable cost function would be acceptable, the model parameter solution may otherwise require costly non-linear optimization techniques. In particular, the constraint cost function is in the form $$\varphi(u,v) = \xi_1 + \xi_2 u + \xi_3 v + \xi_4 uv + \xi_5 u^2 + \xi_6 v^2. \quad (26)$$

Then, Equation (25) can be re-written as $$\begin{bmatrix} \sum_{x,y \in I} (I_x^2 + 2\xi_5) & \sum_{x,y \in I} (I_x I_y + \xi_4) \\ \sum_{x,y \in I} (I_x I_y + \xi_4) & \sum_{x,y \in I} (I_y^2 + 2\xi_6) \end{bmatrix} \begin{bmatrix} u_g \\ v_g \end{bmatrix} = \begin{bmatrix} -\sum_{x,y \in I} (I_x I_{21} + \xi_2) \\ -\sum_{x,y \in I} (I_y I_{21} + \xi_3) \end{bmatrix} \quad (27)$$

The solution of this simple 2 by 2 matrix equation yields the optimal translational motion model parameters $u_g$ and $v_g$ under the given quadratic constraint cost function. Of particular importance is the cost function $$\varphi(u,v) = (u-u_c)^2 + (v-v_c)^2 \quad (28)$$

where we know the expected translational parameters.

Intensity Changes

All methods above are derived under the premise that the intensity of a pixel does not change along the motion trajectory. As explained earlier, this may not always be true. The external illumination may change and the gain/offset of the image capture device may vary between captured frames. To take these effects into account, we modify Equation (10) such that $$\kappa_1 I_1(x_1,y_1) + \kappa_2 = I_2(x_2,y_2) \quad (29)$$

From here, the optimization proceeds exactly as before, except that parameters $\kappa_1$ and $\kappa_2$ need to be estimated as well. We shall now derive the affine motion model parameter estimation equations under the assumption (29). Derivations for other motion models are not repeated since the outline of the derivation is very similar in each case.

Incorporating the affine motion model equations given by the Equation (19), into (29), we write:

$$\kappa_1 I_1(x,y) + \kappa_2 = I_2(x + a_1 x + a_2 y + a_3, y + a_4 x + a_5 y + a_6) \quad (30)$$

From which Taylor Series expansion results in:

$$I_x(x,y)(xa_1+ya_2+a_3)+I_y(x,y)(xa_4+ya_5+a_6)+I_2(x,y)-\kappa_1 I_1(x,y)-\kappa_2 \cong 0 \quad (31)$$

To solve for the unknown parameters, define a cost function $\Psi$ as below:

$$\Psi = \sum_{x_1,y_1 \in I} \left\{ \begin{array}{l} I_x(x,y)(xa_1+ya_2+a_3)+I_y(x,y)(xa_4+ya_5+a_6)+ \\ I_2(x,y)-\kappa_1 I_1(x,y)-\kappa_2 \end{array} \right\}^2 \quad (32)$$

Now take the partial derivatives of $\Psi$ with respect to the affine parameters $a_1,a_2,a_3,a_4,a_5,a_6$ and the illumination change model parameters $\kappa_1,\kappa_2$, and set them equal to zero. After carrying out the algebraic steps, we obtain, $$\begin{bmatrix} \sum xI_xI_x & \sum yI_xI_x & \sum I_xI_x & \sum xI_yI_x & \sum yI_yI_x & \sum I_yI_x & \sum -I_1I_x & \sum -I_x \\ \sum xI_xyI_x & \sum yI_xyI_x & \sum I_xyI_x & \sum xI_yyI_x & \sum yI_yyI_x & \sum I_yyI_x & \sum -I_1yI_x & \sum -yI_x \\ \sum xI_xI_x & \sum yI_xI_x & \sum I_xI_x & \sum xI_yI_x & \sum yI_yI_x & \sum I_yI_x & \sum -I_1I_x & \sum -I_x \\ \sum xI_xI_y & \sum yI_xI_y & \sum I_xI_y & \sum xI_yI_y & \sum yI_yI_y & \sum I_yI_y & \sum -I_1xI_y & \sum -xI_y \\ \sum xI_xyI_y & \sum yI_xyI_y & \sum I_xyI_y & \sum xI_yyI_y & \sum yI_yyI_y & \sum I_yyI_y & \sum -I_1yI_y & \sum -yI_y \\ \sum xI_xI_y & \sum yI_xI_y & \sum I_xI_y & \sum xI_yI_y & \sum yI_yI_y & \sum I_yI_y & \sum -I_1I_y & \sum -I_y \\ \sum xI_xI_1 & \sum yI_xI_1 & \sum I_xI_1 & \sum xI_yI_1 & \sum yI_yI_1 & \sum I_yI_1 & \sum -I_1I_1 & \sum -1I_1 \\ \sum xI_x & \sum yI_x & \sum I_x & \sum xI_y & \sum yI_y & \sum I_y & \sum -I_1 & \sum -1 \end{bmatrix} \begin{bmatrix} a_1 \\ a_2 \\ a_3 \\ a_4 \\ a_5 \\ a_6 \\ \kappa_1 \\ \kappa_2 \end{bmatrix} = \begin{bmatrix} -\sum xI_xI_2 \\ -\sum yI_xI_2 \\ -\sum I_xI_2 \\ -\sum xI_yI_2 \\ -\sum yI_yI_2 \\ -\sum I_yI_2 \\ -\sum I_1I_2 \\ -\sum I_2 \end{bmatrix}$$

Lens Distortion

Figure 2:
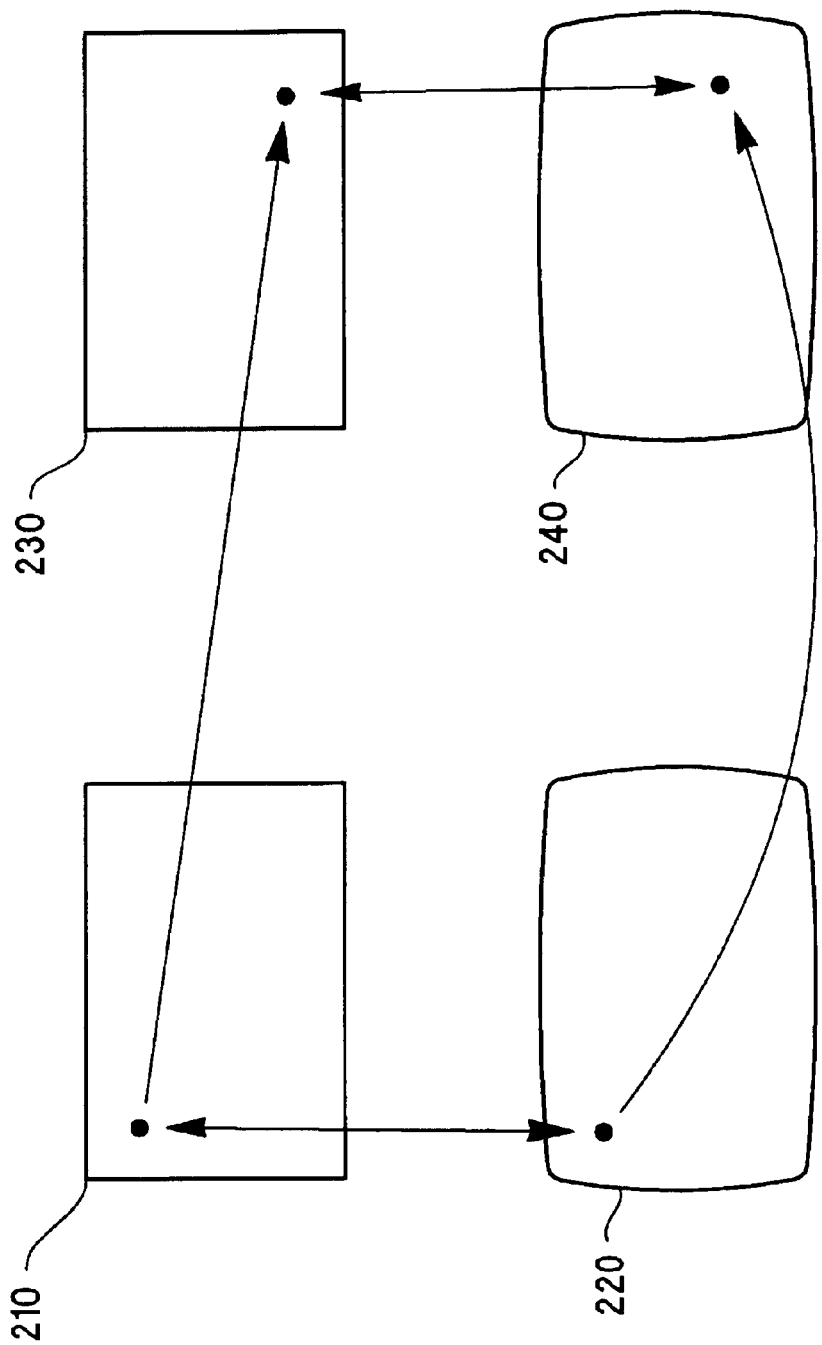
FIG. 2 is a diagram showing geometric lens distortion.

Inexpensive lens systems introduce geometric distortion into the imaging system. This is shown in FIG. 2. Geometric distortion causes the point shown in undistorted first frame 210 to appear in a slightly different location in geometrically distorted image 220. This same distortion causes the apparent motion of this point in undistorted second frame 230 to appear instead at the position shown in distorted second frame 240.

In this section, we will develop methods of motion estimation between images captured with an imperfect lens that causes geometric distortions. The gamma factor and external illumination changes are also taken into account. A nonlinear optimization framework to solve for distortion parameters is introduced. Linearization of this model results in OFE-like equations.

The geometric lens distortions can be modeled as $$x_g = \frac{x}{1 + \kappa_7(x^2 + y^2)} \quad (33)$$

$$y_g = \frac{y}{1 + \kappa_7(x^2 + y^2)} \quad (34)$$

where $\kappa_7$ is the lens geometric distortion parameter, $(x_g, y_g)$ are the distorted pixel positions and $(x,y)$ are the corrected pixel positions.

Using Equation (33) and (34), we write $$\frac{x_g}{y_g} = \frac{x}{y}, \quad (35)$$

Putting Equation (35) into Equation (33) yields $$y^2 \left[ \kappa_7 \left( \frac{x_g^2}{y_g^2} + 1 \right) \right] + y\left( -\frac{1}{y_g} \right) + 1 = 0 \quad (36)$$

There are two solutions to this quadratic equation:

$$y = \frac{1 \pm \sqrt{1 - 4\kappa_7(x_g^2 + y_g^2)}}{2\kappa_7(x_g^2 + y_g^2)} y_g, \quad x = y\frac{x_g}{y_g} \quad (37)$$

As $\kappa_7$ goes to 0, y should approach $y_g$. Since, $$\lim_{\kappa_7 \to 0} \left\{ \frac{1 + \sqrt{1 - 4\kappa_7(x_g^2 + y_g^2)}}{2\kappa_7(x_g^2 + y_g^2)} \right\} y_g = \infty,$$

this can not be a solution. On the other hand, the second solution satisfies this requirement, hence it is the true solution.

$$\lim_{\kappa_7 \to 0} \frac{1 - \sqrt{1 - 4\kappa_7(x_g^2 + y_g^2)}}{2\kappa_7(x_g^2 + y_g^2)} y_g = y_g$$

There are many parametric motion models that map pixels from one frame to another. The affine model is used for subsequent derivation in this section. The translational, bilinear, and perspective motion models follow exactly the same procedure, and are therefore not treated for the sake of space.

Using the geometric distortion model given by Equation (33), we write $$x'_g = \mathfrak{I}_1(\kappa_1, \kappa_2, \kappa_3, \kappa_4, \kappa_5, \kappa_6, \kappa_7, x_g, y_g) = \frac{x'}{1 + \kappa_7(x'^2 + y'^2)} \quad (38)$$

$$y'_g = \mathfrak{I}_2(\kappa_1, \kappa_2, \kappa_3, \kappa_4, \kappa_5, \kappa_6, \kappa_7, x_g, y_g) = \frac{y'}{1 + \kappa_7(x'^2 + y'^2)} \quad (39)$$

where $$y' = \kappa_4 x(x_g, y_g) + \kappa_2 y(x_g, y_g) + \kappa_2 y(x_g, y_g) + \kappa_3 y = \kappa_4 x(x_g, y_g) + \kappa_5 y (x_g, y_g) + \kappa_6 \quad (40)$$

where $x(x_g, y_g)$ and $y(x_g, y_g)$ are as given by Equation (37).

Therefore, we have a nonlinear mapping from one frame to another characterized by 7 parameters. With the assumption that intensity does not change along the motion trajectory, we write:

$$I_1(x_g, y_g) = I_2(x'_g, y'_g) \quad (41).$$

Nonlinear Geometric Correction

We can define a cost function given by $$\Psi = \sum_{x_g, y_g \in I_1} (I_1(x_g, y_g) - I_2(x'_g, y'_g))^2. \quad (42)$$

This is a function of the affine and lens-distortion parameters, $k = (\kappa_1, \kappa_2, \kappa_3, \kappa_4, \kappa_5, \kappa_6, \kappa_7)$ A variant of Powell's method for multivariable nonlinear optimization is used to find the parameters that minimize the cost function. Other multivariable nonlinear optimization methods known in the art may also be used. To speed up the calculation, rather than summing over all $x_g, y_g \in I_1$, summation over several small rectangular regions in the image may be performed. The algorithm's performance depends on the size, location, and number of regions used. The accuracy of the estimate may be improved by choosing regions with features such as corners, rather than uniform regions, and by choosing regions towards the periphery of the image (where warping is more pronounced). Nonlinear optimization methods also benefit from a good initial guess. The affine-motion estimation method is used on the middle portions of the images (where the warping is relatively mild) for initial estimates of the affine parameters.

The widely used lens distortion model given by $x_g = x(1 + \kappa_7(x^2 + y^2))$ is not only a cruder approximation of the physics of the lens, but also give rise to more complicated equations, which requires the calculation of roots of a cubic polynomial.

A hybrid system that alternates between the affine-motion estimation method to estimate the six affine motion parameters, and a one-dimensional nonlinear optimization technique to estimate the lens-distortion parameter is used for optimization. For the one-dimensional optimization, the "Golden Search" method is used to minimize the cost function $\Psi$, here considered as a function of the single parameter $\kappa_7$ with the affine parameters $(\kappa_1, \kappa_2, \kappa_3, \kappa_4, \kappa_5, \kappa_6)$ clamped.

Linearization in Geometric Correction

Figure 3:
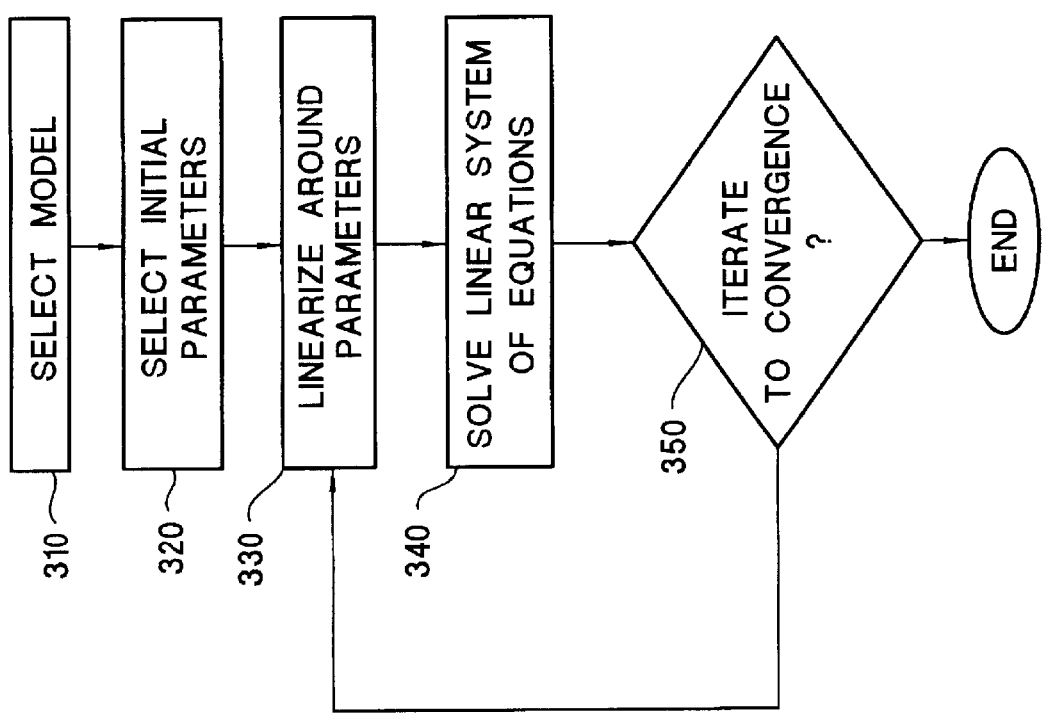
FIG. 3 is a flowchart of the linearized solution.

We may also use a Taylor Series approximation to get a set of linear equations with a closed-form solution. This process is shown in FIG. 3. Once the nonlinear model is selected 310, giving a system of nonlinear equations, an initial set of parameters is selected 320. Given the set of parameters, the system of nonlinear equations is linearized around the set of parameters 330, resulting in a linear system. This linear system of equations is solved 340 using standard techniques to reach a new set of parameters. The process of linearizing the system of nonlinear equations around the set of parameters and resolving the resulting linear solution is iterated 350 until our convergence criteria is met, or for a set number of steps. The linearization 330 is done as shown previously by Taylor Series expansion. If we were to center the Taylor Series around the parameter set $k_{def} = (1,0,0,0,1,0,0)$ as we have done in previous sections, we would get no information about the lens-distortion parameter $\kappa_7$, since.

$$\left.\frac{\partial \mathfrak{I}_1}{\partial \kappa_7}\right|_{k_{def}} = 0 \text{ and } \left.\frac{\partial \mathfrak{I}_2}{\partial \kappa_7}\right|_{k_{def}} = 0.$$

This is expected, since $k_{def} = (1,0,0,0,1,0,0)$ induces zero motion, and with no motion, both images are the same, so we have no hope of recovering the lens-distortion parameter. Likewise, a Taylor Series approximation around a parameter-set corresponding to rotation around the center of the image provides no information on the lens distortion, as the distortion is radial. But other affine-parameter sets ($\kappa_1, \kappa_2, \kappa_3, \kappa_4, \kappa_5, \kappa_6$) yield an observable system for the lens-distortion parameter. More precisely, a Taylor Series approximation of $I_2(x'_g, y'_g)$ around the parameters $K_w = (\kappa_1, \kappa_2, \kappa_3, \kappa_4, \kappa_5, \kappa_6, 0)$ would yield $$I_2(x'_g, y'_g) = I_2(x_g, y_g) + \sum_{i=1}^{7} \frac{\partial I_2}{\partial x} \left.\frac{\partial \mathfrak{I}_1}{\partial \kappa_i}\right|_{k_w} + \sum_{i=1}^{7} \frac{\partial I_2}{\partial y} \left.\frac{\partial \mathfrak{I}_2}{\partial \kappa_i}\right|_{k_w} \quad (43)$$

where $$\left.\frac{\partial \mathfrak{I}_1}{\partial \kappa_1}\right|_{k_w} = x_g \quad \left.\frac{\partial \mathfrak{I}_1}{\partial \kappa_2}\right|_{k_w} = y_g \quad \left.\frac{\partial \mathfrak{I}_1}{\partial \kappa_2}\right|_{k_w} = 1$$

$$\left.\frac{\partial \mathfrak{I}_1}{\partial \kappa_4}\right|_{k_w} = 0 \quad \left.\frac{\partial \mathfrak{I}_1}{\partial \kappa_5}\right|_{k_w} = 0 \quad \left.\frac{\partial \mathfrak{I}_1}{\partial \kappa_6}\right|_{k_w} = 0$$

$$\left.\frac{\partial \mathfrak{I}_1}{\partial \kappa_7}\right|_{k_w} = (-k_1^3 + k_1 - k_1 k_4^2)x_g^3 +$$

$$(-2k_1 k_4 k_5 - 3k_1^2 k_2 - k_2 k_4^2 + k_2)x_g^2 y_g +$$

$$(-3k_1 k_2^2 + k_1 - 2k_2 k_4 k_5 - k_1 k_5^2)x_g y_g^2 +$$

$$(-k_2^3 + k_2 - k_2 k_5^2)y_g^3 + (-3k_1^2 k_3 - 2k_1 k_4 k_6 - k_3 k_4^2)x_g^2 +$$

$$(-6k_1 k_2 k_3 - 2k_2 k_4 k_6 - 2k_3 k_4 k_5 - 2k_1 k_5 k_6)x_g y_g +$$

$$(-2k_2 k_5 k_6 - k_3 k_5^2 - 3k_2^2 k_3)y_g^2 +$$

$$(-3k_1 k_3^2 - k_1 k_6^2 - 2k_3 k_4 k_6)x_g +$$

$$(-k_2 k_6^2 - 3k_2 k_3^2 - 2k_3 k_5 k_6)y_g + (-k_3^3 - k_3 k_6^2)$$

-continued $$\left.\frac{\partial \Im_2}{\partial \kappa_1}\right|_{k_w} = 0 \quad \left.\frac{\partial \Im_2}{\partial \kappa_2}\right|_{k_w} = 0 \quad \left.\frac{\partial \Im_2}{\partial \kappa_2}\right|_{k_w} = 0$$

$$\left.\frac{\partial \Im_2}{\partial \kappa_4}\right|_{k_w} = x_g \quad \left.\frac{\partial \Im_2}{\partial \kappa_5}\right|_{k_w} = y_g \quad \left.\frac{\partial \Im_2}{\partial \kappa_6}\right|_{k_w} = 1$$

$$\left.\frac{\partial \Im_2}{\partial \kappa_7}\right|_{k_w} = (-k_4 k_1^2 - k_4^3 + k_4) x_g^3 +$$
$$(-k_5 k_1^2 - 3k_4^2 k_5 - 2k_4 k_1 k_2 + k_5) x_g^2 y_g +$$
$$(-2k_5 k_1 k_2 + k_4 - k_4 k_5^2 - 3k_4 k_5^2) x_g y_g^2 +$$
$$(-k_5 k_2^2 - k_5^3 + k_5) y_g^3 + (-k_6 k_1^2 - 3k_4^2 k_6 - 2k_4 k_1 k_3) x_g^2 +$$
$$(-6k_4 k_6 k_5 - 2k_4 k_3 k_2 - 2k_5 k_1 k_3 - 2k_6 k_1 k_2) x_g y_g +$$
$$(-2k_5 k_3 k_2 - k_6 k_2^2 - 3k_6 k_5^2) y_g^2 +$$
$$(-2k_6 k_1 k_3 - 3k_4 k_6^2 - k_4 k_3^2) x_g +$$
$$(-3k_6^2 k_5 - 2k_6 k_3 k_2 - k_5 k_3^2) y_g + (-k_6^3 - k_6 k_3^2)$$

The method described earlier is used for an initial estimate of the affine parameters, which are then used as the center of the Taylor series expansion. If the initial estimate is almost entirely translational, one may expand the Taylor series around just the translational component of the initial estimate to simplify the computations, taking $k_w = (1, 0, \kappa_3, 0, 1, \kappa_6, 0)$. This gives $$\left.\frac{\partial \Im_1}{\partial \kappa_7}\right|_{k_w} =$$
$$-3k_3 x_g^2 - 2k_6 x_g y_g - k_3 y_g^2 - (k_6^2 + 3k_3^2) x_g - 2k_3 k_6 y_g - (-k_3^3 + k_3 k_6^2)$$

and $$\left.\frac{\partial \Im_2}{\partial \kappa_7}\right|_{k_w} = -k_6 x_g^2 - 2k_3 x_g y_g - 3k_6 y_g^2 - 2k_6 k_3 x_g - (3k_6^2 + k_3^2) y_g - (k_6^3 + k_6 k_3^2)$$

but may give inaccurate results if there is a substantial non-translational aspect to the motion.

Substituting Equation (43) into Equation (42), and taking the derivatives and setting them equal to zero yields the following linear matrix equation:

where $$\mu = \left.\frac{\partial \Im_1}{\partial \kappa_7}\right|_{k_w} I_x + \left.\frac{\partial \Im_1}{\partial \kappa_7}\right|_{k_w}$$

$I_y$ and $I_w = I_2(x,y) - I_1(x_w, y_w)$, with $x_w$ and $y_w$ the images of x and y under the transformation given by $k_w = (\kappa_1, \kappa_2, \kappa_3, \kappa_4, \kappa_5, \kappa_6, 0)$.

Illumination Correction

With the incorporation of external illumination change and offset variation in capture devices as explained earlier, we modify Equation (41) as $$\kappa_8 I_1(x_g, y_g) + \kappa_9 = I_2(x'_g, y'_g), \quad (44)$$

and we redefine the cost function in terms of motion, lens distortion, and illumination change parameters as:

$$\Psi = \sum_{x_g, y_g \in I_1} (\kappa_8 I_1(x_g, y_g) + \kappa_9 - I_2(x'_g, y'_g))^2 \quad (45)$$

To account for vignetting effect, the vignetting correction function is introduced, and Equation (44) modified as $$\frac{\kappa_8 I_1(x_g, y_g) + \kappa_9}{W(x_g, y_g)} = \frac{I_2(x'_g, y'_g)}{W(x'_g, y'_g)} \quad (46)$$

where $$W(x_g, y_g) = \kappa_{10} \cos^4\left(\arctan\left(\frac{\sqrt{x_w^2 + y_w^2}}{f}\right)\right) + (1 - \kappa_{10})$$

where f is the camera focal length, and $(x_w, y_w)$ is the camera imaging plane coordinates of the pixel $(x_g, y_g)$.

Then we can define a cost function in terms of $(\kappa_1, \kappa_2, \kappa_3, \kappa_4, \kappa_5, \kappa_6, \kappa_7, \kappa_8, \kappa_9, \kappa_{10})$ as $$\begin{bmatrix} \sum xI_x xI_x & \sum yI_x xI_x & \sum I_x xI_x & \sum xI_y xI_x & \sum yI_y xI_x & \sum I_y xI_x & \sum \mu xI_x \\ \sum xI_x yI_x & \sum yI_x yI_x & \sum I_x yI_x & \sum xI_y yI_x & \sum yI_y yI_x & \sum I_y yI_x & \sum \mu yI_x \\ \sum xI_x I_x & \sum yI_x I_x & \sum I_x I_x & \sum xI_y I_x & \sum yI_y I_x & \sum I_y I_x & \sum \mu I_x \\ \sum xI_x xI_y & \sum yI_x xI_y & \sum I_x xI_y & \sum xI_y xI_y & \sum yI_y xI_y & \sum I_y xI_y & \sum \mu xI_y \\ \sum xI_x yI_y & \sum yI_x yI_y & \sum I_x yI_y & \sum xI_y yI_y & \sum yI_y yI_y & \sum I_y yI_y & \sum \mu yI_y \\ \sum xI_x I_y & \sum yI_x I_y & \sum I_x I_y & \sum xI_y I_y & \sum yI_y I_y & \sum I_y I_y & \sum \mu I_y \\ \sum xI_x \mu & \sum yI_x \mu & \sum I_x \mu & \sum xI_y \mu & \sum yI_y \mu & \sum I_y \mu & \sum \mu\mu \end{bmatrix} \begin{bmatrix} \Delta k_1 \\ \Delta k_2 \\ \Delta k_3 \\ \Delta k_4 \\ \Delta k_5 \\ \Delta k_6 \\ \Delta k_7 \end{bmatrix} = \begin{bmatrix} -\sum xI_x I_w \\ -\sum yI_x I_w \\ -\sum I_x I_w \\ -\sum xI_y I_w \\ -\sum yI_y I_w \\ -\sum I_y I_w \\ -\sum \mu I_w \end{bmatrix}$$

$$\Psi = \sum_{x_g, y_g \in I_1} \left( \frac{\kappa_{10} I_1(x_g, y_g) + \kappa_{11}}{W(x_g, y_g)} - \frac{I_2(x'_g, y'_g)}{W(x'_g, y'_g)} \right)^2 \quad (47)$$

This cost function can again be minimized via non-linear optimization techniques, or we can perform Taylor Series approximation to arrive at a set of linear equations, which can easily be solved.

The foregoing detailed description of the present invention is provided for the purpose of illustration and is not intended to be exhaustive or to limit the invention to the precise embodiments disclosed. Accordingly the scope of the present invention is defined by the appended claims.

What is claimed is:

1. A method for correcting distortion in an imaging system, the method comprising:
   a) applying a motion estimation model to a first and a second image to generate a set of nonlinear equations representing distortion, wherein the motion estimation model accommodates a change in illumination along at least one motion trajectory between the first and second images;
   b) solving the set of nonlinear equations to produce a set of correction parameters; and
   c) correcting at least one of the first and second images using the correction parameters to remove distortion.

2. The method of claim 1 where the distortion includes geometric lens distortion.

3. The method of claim 2 wherein geometric lens distortion is modeled by the transform:

$$x_g = \frac{x}{1 + \kappa_7 (x^2 + y^2)} \quad y_g = \frac{y}{1 + \kappa_7 (x^2 + y^2)}$$

where (x,y) are the corrected pixel locations, ($x_g, y_g$) are distorted pixel locations, and $\kappa_7$ is a geometric lens distortion factor.

4. The method of claim 1 wherein the correction parameters correct a change in illumination along the at least one motion trajectory.

5. The method of claim 4 wherein illumination changes are modeled with a linear model.

6. The method of claim 4 wherein illumination changes are modeled with a Vignetting model.

7. The method of claim 1 where the method of solving the set of nonlinear equations is a multivariable nonlinear optimization method.

8. The method of claim 1 wherein step b) further comprises:
   a) selecting an initial set of solution parameters;
   b) linearizing the set of nonlinear equations around the set of solution parameters;
   c) solving the resulting linearized set of equations to reach an updated set of solution parameters; and
   d) repeating steps b) and c) until a condition defined by a selected one of a finite number of iterations and a predetermined convergence criteria is met.

9. The method of claim 8 where the set of nonlinear equations includes correction for geometric lens distortion.

10. The method of claim 8 where the set of nonlinear equations includes correction for illumination changes.

11. The method of claim 8 where the set of nonlinear equations includes correction for both geometric lens distortion and illumination changes.

12. The method of claim 11 where the model for illumination changes is a linear model.

13. The method of claim 11 where the model for illumination changes is a Vignetting model.

14. The method of claim 11 wherein geometric lens distortion is modeled by the transform:

$$x_g = \frac{x}{1 + \kappa_7 (x^2 + y^2)} \quad y_g = \frac{y}{1 + \kappa_7 (x^2 + y^2)}$$

where (x,y) are the corrected pixel locations, ($x_g, y_g$) are distorted pixel locations, and $\kappa_7$ is the distortion factor.

15. A computer storage medium having instructions stored therein for programming a computer to perform the method of claim 11.

16. The method of claim 1 wherein step a) further comprises the step of performing motion estimation modeling using at least one of a translational motion model, an affine motion model, a bilinear motion model, and a perspective motion model.

* * * * *